United States Patent Office 3,423,328
Patented Jan. 21, 1969

3,423,328
SILVER-BARIUM CATALYST
Carl D. Keith, Summit, Saul G. Hindin, Mendham, and Ludwig A. Galen, East Orange, N.J., assignors to Engelhard Industries, Inc., Newark, N.J., a corporation of Delaware
No Drawing. Filed Nov. 22, 1965, Ser. No. 509,168
U.S. Cl. 252—430                                6 Claims
Int. Cl. B01j *11/08*

ABSTRACT OF THE DISCLOSURE

Supported silver catalysts having a silver crystallite size of 150–400 A. and having uniform composition, good adhesion and electrical conductivity are produced by precipitating $Ag_2CO_3$ from a silver salt at a controlled pH to give $Ag_2CO_3$ with a crystallite size of about 150–400 A., washing the $Ag_2CO_3$ substantially free of alkali ions, blending an aqueous slurry of the $Ag_2CO_3$ and barium hydroxide in the proportion of 1–25 parts Ba to 100 parts Ag (by weight), impregnating an inert support with the slurry, and activating the catalyst in a $H_2$ containing stream at 100°–400° C. Such catalysts are highly selective and active for the oxidation of ethylene to ethylene oxide.

This invention relates to supported silver catalysts and their method of preparation and more particularly concerns silver catalysts which are effective for the oxidation of ethylene to ethylene oxide.

Catalytic oxidation of ethylene to ethylene oxide is well known and silver catalysts, especially supported silver catalysts, have been used in commercial processes. It is also well known to add metals and metal oxides, e.g., alkaline oxides to the catalysts as promoters. The catalysts for these processes must be highly selective for the production of ethylene oxide, yet have high activity. They must be durable, and further, in order to be economically attractive, they must make very efficient use of the expensive silver component so that the concentration of silver is kept at a minimum. Heretofore conventional catalysts have exhibited lack of uniformity of composition and poor adhesion of the catalytic metal on the supports. These difficulties have led to variations in catalytic behavior causing hot spots in the reactor and resulting in loss of selectivity and deactivation of the catalysts. The dusting of conventional catalysts is particularly troublesome since it leads to clogging of the reactor and harmful back pressure as well as deactivating the catalyst. These problems are particularly prevalent in processes operating at elevated pressures, e.g., in the range of 200–500 p.s.i.g.

It is an object of this invention to obtain catalysts having good resistance to dusting, high selectivity, and uniformity in composition. It is a particular object to attain these characteristics without sacrificing the activity of the catalyst. It is also an object to prepare a catalyst which makes efficient use of the expensive silver component. It is a further object to obtain a catalyst which can be used in processes operating at elevated as well as atmospheric pressures.

In accordance with this invention, catalysts having the desired characteristics are obtained by a method of preparation comprising precipitating $Ag_2CO_3$ from an aqueous solution of a silver salt with an alkali carbonate at a pH of 7.5 to 10 to give $Ag_2CO_3$ having a crystalline size of about 150–400 A., washing and filtering the $Ag_2CO_3$ precipitate to remove alkali metal ions, blending the silver carbonate with barium hydroxide to form a fine slurry containing from 1 to 25 parts by weight barium per 100 parts by weight silver, and impregnating an inert, particulate support with the silver carbonate-barium hydroxide slurry in an aqueous medium having a pH of about 7 to 12. In a preferred embodiment, the $Ag_2CO_3$ precipitate is filtered to a cake retaining 15–60% and preferably 25–45% moisture. Suitable support materials include refractory oxides such as fused alumina, silica, refractory Alundum, silica-alumina composites containing up to about 15% silica, and the like. A preferred support comprises Alundum having a water absorption of 10 to 35%, a surface area of about 1 m.$^2$/g., and is in the form of slightly irregular spheres which may range in size from $3/16''$ to $3/8''$ in diameter. This particular structure of the catalyst support is important to balance efficient use of the silver component of the catalyst and adhesion of the silver on the support.

The impregnated support is dried in air at about 90° to 110° C. and then activated in a hydrogen-containing gas, e.g., a nitrogen-hydrogen mixture containing from 1–10% hydrogen, at a volume hourly space velocity of 50 to 5,000 and a temperature of about 250° to 400° C., and thereafter cooled down in the presence of the hydrogen-containing gas. Alternatively the catalyst may be both dried and activated in a hydrogen-containing atmosphere at about 250–400° C. However, at no time should the temperature be permitted to exceed 110° C. in the absence of hydrogen or 400° C. in the presence of hydrogen.

Catalysts prepared in this way preferably contain from 5 to 20% silver and 0.1 to 5% barium based on the total weight of supported catalyst. The silver of catalysts prepared by the method of this invention exhibits a crystallite size of 150–400 Angstroms. It is believed that the small crystallite size obtained contributes to the efficient use of the catalyst, since at the available surface it is desirable to have a maximum number of catalyst sites available.

In an alternate method, 1–5% gelatin (based on total final catalyst weight) is blended together with the silver carbonate-barium hydroxide slurry. Catalysts prepared with gelatin have been demonstrated to have long life even under severe conditions. In another embodiment, the support is treated with nitric acid to remove impurities such as the transitional metals which are deleterious to selectivity. In such case, caution must be used to remove all the nitric acid and to resinter the support material, for example by heat treatment for 2–4 hours at a temperature of about 1000° C. prior to impregnation with the silver.

Catalysts tested before and after use were found to be electrically conductive. It is believed that this property, which gives the catalysts good heat conductivity, contributes to the selectivity and long life of the catalysts.

EXAMPLE 1

To 4 liters of water, 18.1 liters of aqueous 20% silver nitrate solution and 11.5 liters of 10% sodium carbonate solution were added slowly at room temperature. The pH of the supernatant liquid was about 8 to 10. After washing the light yellow precipitate of silver carbonate essentially free of sodium ions by decantation, it was filtered to give a moist precipitate containing about 35% moisture. A portion of the moist silver carbonate containing about 2.84 parts by weight silver carbonate dry basis was blended in a Waring Blendor with 0.14 part by weight of barium hydroxide octahydrate. After vigorous blending to deglomerate the particles, the fine slurry was permitted to settle. This blending procedure was repeated twice and thereafter a portion of the supernatant liquid was decanted in order to obtain a more concentrated slurry.

Thereafter the slurry was slowly heated to boiling with frequent stirring. This slurry tended to settle slowly and, while still hot and in suspension, slurry was added in portions to 12 parts by weight of 5/16" diameter Alundum spheres, having 15 to 19% water absorption. The slurry was added to the spheres which were heated and rolled in a rotating kiln. The coated spheres were then air dried in a kiln at approximately 110° C. and allowed to cool. At room temperature, in a tube furnace, the catalyst was treated with a gas composed of 7% hydrogen and 93% nitrogen, and while the hydrogen-containing gas was fed at a volume hourly space velocity of 200, the temperature was raised to 250–300° C., and held there for about 3 hours. The catalyst was then cooled in the hydrogen-containing gas to ambient temperature. Thereafter it was screened to remove any fines and found to have good silver adhesion. On analysis the catalyst was composed of 13% silver and 0.3% barium oxide on the support. This catalyst was employed in Test A, Table I.

Samples of silver carbonate precipitates as described and filtered were dried under an IR lamp at a temperature of less than about 100° C. while drying and analyzed for $Ag_2CO_3$ crystallite size by X-ray diffraction. The $Ag_2CO_3$ was found to have a crystallite size of about 150–400 A. Samples of the supported catalyst also were found to have a crystallite size of about 150–400 A.

Example 2

Catalysts of Tests A through D shown in Table I were prepared in accordance with the procedure of Example 1 and tested as follows:

A gas mixture containing 5.0% $C_2H_4$, 6.0% $O_2$, 6.0% $CO_2$, 0.5% $C_2H_6$, 2 to 5 parts per million $C_2H_3Cl_2$, balance $N_2$ was fed to a reactor containing 47 ml. catalyst at atmospheric pressure and elevated temperature. The volume hourly space velocity was 520 and the contact time on the catalyst was 3.0 seconds. At various intervals on stream the effluent was analyzed by IR for ethylene and ethylene oxide content. Percent conversion, percent selectivity and percent yield were calculated as follows:

$$\text{Percent conversion} = \frac{\text{percent } C_2H_4 \text{ (in feed)} - \text{percent } C_2H_4 \text{ (in product)}}{\text{percent } C_2H_4 \text{ (in feed)}} \times 100$$

$$\text{Percent selectivity} = \frac{\text{percent } C_2H_4O \text{ (in product)}}{\text{percent } C_2H_4 \text{ (consumed)}} \times 100$$

$$\text{Percent yield} = \frac{\text{percent } C_2H_4O \text{ (in product)}}{\text{percent } C_2H_4 \text{ (in feed)}} \times 100$$

EXAMPLE 3

A catalyst was prepared using the same procedure described in Example 1 except that 1.5% gelatin (based on calculated total final catalyst weight) was added to the silver carbonate-barium hydroxide slurry. The resultant catalyst comprised 8% silver-1% BaO on 5/16" diameter Alundum spheres, was treated in accordance with the procedure described in Example 2. On analysis the silver catalyst had a crystallite size of 247 Angstroms. The results tabulated from the data obtained at the indicated running time are shown in Table II.

TABLE II

| Running Time | Temp. (° C.) | $C_2H_4Cl_2$ (p.p.m.) | Conversion (percent) | Selectivity (percent) | Yield (percent) |
|---|---|---|---|---|---|
| 144 | 275 | 3 | 58 | 60 | 35 |
| 221 | 285 | 3 | 55 | 58 | 32 |
| 331 | 295 | 5 | 70 | 53 | 37 |
| 498 | 295 | 5 | 63 | 66 | 41 |
| 503 | 295 | 5 | 61 | 64 | 39 |
| 553 | 295 | 5 | 59 | 65 | 38 |
| 773 | 295 | 5 | 57 | 65 | 37 |
| 822 | 302 | 5 | 59 | 63 | 37 |
| 923 | 296 | 5 | 68 | 58 | 40 |
| 1,162 | 287 | 5 | 65 | 57 | 37 |

The run was terminated after 1255 hours. It was found that even though subjected to unusually high temperatures for this process the catalyst had exceptionally good selectivity and activity over the life of the test.

EXAMPLE 4

In order to show the effect of treating the catalyst supports with nitric acid, tests were run using a similar procedure to that shown in Example 2, but in these tests 20 spheres of support material were placed at the outlet end of a catalyst bed containing 20 spheres of a catalyst. The catalyst was prepared as shown in Example 1. The support material was 5/16" diameter Alundum spheres having water absorption of 27 to 31% and surface area of 1 m.²/g. The purpose of superimposing the support material on the catalyst was to determine if the support contributed in any way to the destruction of ethylene oxide formed. In Run 1 the added support was untreated. In Run 2 the same support was used as in Run 1 except that it was washed with a dilute solution of $HNO_3$. In Run 3 the catalyst support was treated as in Run 2 except that after washing with $HNO_3$ the support was heated in air for four hours at 1000° C. This series of tests were performed at 225 p.s.i.g. The results are shown in Table III.

TABLE I

| Test | Catalyst Description | Running Time (Hours) | $C_2H_4Cl_2$ (p.p.m.) | Temperature (° C.) | Conversion (Percent) | Selectivity (Percent) | Yield (Percent) |
|---|---|---|---|---|---|---|---|
| A | 13% Ag–0.3% BaO | 16 | 3 | 270 | 73 | 58 | 42 |
|   |   | 17 | 3 | 270 | 73 | 58 | 42 |
|   |   | 19 | 3 | 260 | 66 | 60 | 39 |
|   |   | 47 | 3 | 250 | 59 | 60 | 35 |
|   |   | 65 | 3 | 260 | 55 | 60 | 33 |
|   |   | 161 | 3 | 270 | 59 | 58 | 34 |
|   |   | 185 | 2 | 270 | 62 | 57 | 35 |
| B | 10% Ag–0.5% BaO | 22 | 3 | 270 | 65 | 61 | 40 |
|   |   | 93 | 3 | 260 | 60 | 60 | 36 |
|   |   | 140 | 5 | 270 | 56 | 65 | 36 |
|   |   | 165 | 5 | 280 | 69 | 61 | 42 |
|   |   | 695 | 5 | 309 | 65 | 59 | 38 |
| C | 10% Ag–1.0% BaO | 20 | 3 | 260 | 67 | 62 | 41 |
|   |   | 22 | 3 | 250 | 52 | 67 | 35 |
| D | 8% Ag–3.0% BaO | 16 | 3 | 260 | 59 | 55 | 33 |
|   |   | 20 | 3 | 250 | 56 | 57 | 32 |

TABLE III
[Temperature, 250° C.; Pressure, 225 p.s.i.g.; $C_2H_4Cl_2$, 3 p.p.m.]

| | Running Time (Hours) | Contact Time (Seconds) | Conversion (percent) | Selectivity (Percent) | Yield (Percent) |
|---|---|---|---|---|---|
| Run No.: | | | | | |
| 1 | 16 | 54 | 50 | 39 | 20 |
|   | 17 | 54 | 48 | 47 | 22 |
| 2 | 16 | 54 | 48 | 0 | 0 |
|   | 17 | 54 | 48 | 4 | 1 |
| 3 | 16 | 54 | 56 | 47 | 26 |
|   | 19 | 36 | 50 | 58 | 29 |
|   | 20 | 36 | 53 | 50 | 26 |

The data in Table III show that treatment of the support with $HNO_3$ followed by resintering was beneficial for the process. The data also show that the catalysts of this invention have good selectivity and are active for producing ethylene oxide at elevated pressure.

What is claimed is:

1. A process for preparing a supported silver catalyst comprising the steps of:
   (a) precipitating $Ag_2CO_3$ from an aqueous solution of a silver salt with alkali carbonate at a pH of 7.5–10, to give $Ag_2CO_3$ having a crystallite size of about 150–400 A.;
   (b) washing the $Ag_2CO_3$ substantially free of alkali ions;
   (c) blending an aqueous slurry of the silver carbonate with barium hydroxide to provide from 1 to 25 parts by weight barium per 100 parts by weight silver in said slurry;
   (d) adding the slurry to an inert particulate support to impregnate said support with silver carbonate containing barium hydroxide;
   (e) activating the catalyst in a stream of hydrogen-containing gas at a temperature of 100° to 400° C.; and cooling the activated catalyst to ambient temperature, said catalyst containing from 5 to 20% by weight silver and from 0.1 to 5% by weight barium based on the total weight of supported catalyst; whereby the catalyst produced is electrically conductive and the silver in the supported catalyst has a crystallite size of 150–400 A.

2. A process according to claim 1 wherein the $Ag_2CO_3$ precipitate is filtered to provide a filter cake containing 25–45% free moisture.

3. A process according to claim 1 wherein the activated catalyst is cooled in a hydrogen-containing atmosphere.

4. A process according to claim 1 wherein the impregnated supports are dried in air at about 90° to 110° C. and then activated in a stream of hydrogen-containing gas at a temperature of 100° to 400° C.

5. A process according to claim 1 wherein 1–5% gelatin based on final catalyst weight is added to the slurry of silver carbonate and barium hydroxide.

6. A process according to claim 1 wherein the support material is treated with $HNO_3$ and sintered at a temperature of about 1000° C. before impregnation.

References Cited

UNITED STATES PATENTS

| | | | |
|---|---|---|---|
| 2,709,173 | 5/1955 | Brenge et al. | 252—463 |
| 2,752,362 | 6/1956 | Landau | 252—463 |
| 2,825,701 | 3/1958 | Endler et al. | 252—476 |
| 2,920,052 | 1/1960 | Martin | 252—463 |
| 3,033,800 | 5/1962 | Elliot et al. | 252—466 |
| 3,125,538 | 3/1964 | Arnold et al. | 252—476 |
| 3,172,893 | 3/1965 | Ameen | 252—463 |
| 3,317,439 | 5/1967 | Stiles | 252—476 |

FOREIGN PATENTS

| | | |
|---|---|---|
| 514,792 | 11/1939 | Great Britain. |
| 466,416 | 5/1937 | Great Britain. |
| 592,091 | 2/1960 | Canada. |

DANIEL E. WYMAN, *Primary Examiner.*

P. E. KONOPKA, *Assistant Examiner.*

U.S. Cl. X.R.

252—428, 463, 475, 457; 260—348.5